United States Patent
Chen et al.

(10) Patent No.: US 9,128,320 B2
(45) Date of Patent: Sep. 8, 2015

(54) THREE-DIMENSIONAL DISPLAY AND THREE DIMENSIONAL DISPLAY SYSTEM

(75) Inventors: Wen-Lung Chen, Hsinchu County (TW); Chih-Jen Hu, Taoyuan County (TW); Yue-Shih Jeng, Miaoli County (TW); I-Hsiung Huang, Changhua County (TW); Po-Wei Wu, Taichung (TW); Yu-June Wu, Taoyuan County (TW); Chih-Wen Chen, Tainan (TW); Meng-Chieh Tsai, Taipei County (TW)

(73) Assignee: Au Optronics Corporation, Hsinchu (TW)

( * ) Notice: Subject to any disclaimer, the term of this patent is extended or adjusted under 35 U.S.C. 154(b) by 1476 days.

(21) Appl. No.: 12/546,711

(22) Filed: Aug. 25, 2009

(65) Prior Publication Data

US 2010/0315566 A1 Dec. 16, 2010

(30) Foreign Application Priority Data

Jun. 10, 2009 (TW) ............................... 98119484 A

(51) Int. Cl.
*G02F 1/1335* (2006.01)
*G02B 27/22* (2006.01)

(52) U.S. Cl.
CPC ...... *G02F 1/133526* (2013.01); *G02B 27/2214* (2013.01)

(58) Field of Classification Search
CPC ...................... G02B 27/2214; G02F 1/133526
USPC ........................................................... 349/15
See application file for complete search history.

(56) References Cited

U.S. PATENT DOCUMENTS

| 4,987,487 | A | 1/1991 | Ichinose et al. |
| 5,956,001 | A | 9/1999 | Sumida et al. |
| 6,377,295 | B1 | 4/2002 | Woodgate et al. |
| 6,496,218 | B2 * | 12/2002 | Takigawa et al. ............... 348/42 |
| 7,372,629 | B2 * | 5/2008 | Uehara et al. ................. 359/463 |
| 2007/0035672 | A1 | 2/2007 | Shestak et al. |
| 2007/0035829 | A1 | 2/2007 | Woodgate et al. |

FOREIGN PATENT DOCUMENTS

TW I279585 4/2007

* cited by examiner

*Primary Examiner* — Paisley L Arendt
(74) *Attorney, Agent, or Firm* — Jianq Chyun IP Office

(57) ABSTRACT

A three-dimensional display including a display and a micro-lens is provided. The display has a plurality of pixel units thereon, and each pixel unit has a pixel pitch i. The micro-lens is disposed at a side of the display, the micro-lens has a plurality of lens units thereon, and each lens unit has a lens pitch l. A right eye viewing zone and a left eye viewing zone are formed if an image displayed from the display passes though the micro-lens, wherein a distance between the center of the right eye viewing zone and the center of the left eye viewing zone is $w_z$, and lens pitch l satisfies:

$$2i > l \geq 2i \times \frac{w_z}{w_z + i},$$

$w_z$ is between 70 and 500 mm and i is between 0.1 and 500 μm.

23 Claims, 6 Drawing Sheets

THREE-DIMENSIONAL DISPLAY AND THREE DIMENSIONAL DISPLAY SYSTEM

CROSS-REFERENCE TO RELATED APPLICATION

This application claims the priority benefit of Taiwan application serial no. 98119484, filed on Jun. 10, 2009. The entirety of the above-mentioned patent application is hereby incorporated by reference herein and made a part of specification.

BACKGROUND OF THE INVENTION

1. Field of Invention

The present invention relates to a display. More particularly, the present invention relates to a three-dimensional display and a three-dimensional display system with a three-dimensional display.

2. Description of Related Art

Currently, with the progressive development of the display technology, the viewers demand for higher display quality of the display, such as image resolution, color saturation and etc. . . . However, except for the high resolution and color saturation, whether the display can display a three-dimensional image is a key factor for the viewer to buy the display or not.

Typically, there are three types of technologies for forming an image, such as the holographic type technology, the multi-plane technology and the parallax-image technology. Since the holographic type technology and the multi-plane technology possess the difficulty of handling huge amount of data and the poor display result, the parallax-image technology becomes the current major stereo image formation technology. The parallax-image technology uses the spatial-multiplexed three-dimensional display technology as the major application technology. In the spatial-multiplexed three-dimensional display technology, the lenticular screen or the parallax barrier is used to form the viewing zones for the right eye and the left eye of the viewer in order to establish the stereo image effect. As shown in FIG. 1, the three-dimensional display 100 generates the right-eye viewing zones R1 and R2 and the left-eye viewing zones L1 and L2 in a particular distance away from the three-dimensional display 100. Normally, the width of each of the right-eye viewing zones R1 and R2 and the left-eye viewing zones L1 and L2 is about 65 mm.

As shown in FIG. 2A, when the left eye 10a and the right eye 10b of the viewer are in the left-eye viewing zone L2 and the right-eye viewing zone R1 respectively, the viewer can see the three-dimensional image. Since the width of each of the right-eye viewing zones R1 and R2 and the left-eye viewing zones L1 and L2 is only about 65 mm, the left eye 10a and the right eye 10b of the viewer are in the right-eye viewing zone R1 and the left-eye viewing zone L1 respectively (as shown in FIG. 2B) when the viewer slightly moves toward to the left. That is, the left eye 10a and the right eye 10b of the viewer directly enter the left-right-eye inversion region and will see a reversal view. Hence, it is easy for the viewer to feel dizzy and uncomfortable. Similarly, if the viewer moves toward to the right (as shown in FIG. 2C), the left eye 10a and the right eye 10b of the viewer are in the right-eye viewing zone R2 and the left-eye viewing zone L2 respectively. That is, the left eye 10a and the right eye 10b of the viewer directly enter the left-right-eye inversion region and will see a reversal view also. Hence, the viewer also feels dizzy and uncomfortable.

SUMMARY OF THE INVENTION

Accordingly, at least one objective of the present invention is to provide a three-dimensional display and a three-dimensional display system equipped with the three-dimensional display capable of decreasing the feel of dizziness and uncomfortable viewing effect of the viewer due to viewer's right-and-left movement.

To achieve these and other advantages and in accordance with the purpose of the invention, as embodied and broadly described herein, the invention provides a three-dimensional display comprising a display and a micro-lens. The display has a plurality of pixel units thereon and each of the pixel units has a pixel pitch. The micro-lens is disposed at a side of the display and having a plurality of lens units, wherein each of the lens units has a lens pitch. A right-eye viewing zone and a left-eye viewing zone are formed as an image displayed on the display passes through the micro-lens and a distance between the center of the right-eye viewing zone and the lens pitch satisfies:

$$2i > l \geq 2i \times \frac{w_z}{w_z + i},$$

wherein i denotes the pixel pitch, l denotes the lens pitch, $w_z$ denotes a distance between the center of the right-eye viewing zone and the center of the left-eye viewing zone, the distance between the center of the right-eye viewing zone and the center of the left-eye viewing zone is about 70~500 mm and the pixel pitch is about 0.1~500 µm.

The present invention also provides a three-dimensional display system comprising a three-dimensional display and a driver circuit electrically connecting to the three-dimensional display. The three-dimensional display comprises a display and a micro-lens. The display has a plurality of pixel units thereon and each of the pixel units has a pixel pitch. The micro-lens is disposed at a side of the display and having a plurality of lens units, wherein each of the lens units has a lens pitch. A right-eye viewing zone and a left-eye viewing zone are formed as an image displayed on the display passes through the micro-lens and the lens pitch satisfies:

$$2i > l \geq 2i \times \frac{w_z}{w_z + i},$$

wherein i denotes the pixel pitch, l denotes the lens pitch, $w_z$ denotes a distance between the center of the right-eye viewing zone and the center of the left-eye viewing zone, the distance between the center of the right-eye viewing zone and the center of the left-eye viewing zone is about 70~500 mm and the pixel pitch is about 0.1~500 µm.

The present invention further provides a three-dimensional liquid crystal display system comprising a liquid crystal display and a driver circuit electrically connecting to the liquid crystal display. The liquid crystal display comprises a plurality of pixel units thereon and a micro-lens. Each of the pixel units has a pixel pitch. The micro-lens is disposed at a side of the liquid crystal display and having a plurality of lens units, wherein each of the lens units has a lens pitch. A right-eye viewing zone and a left-eye viewing zone are formed as an image displayed on the liquid crystal display passes through the micro-lens and the lens pitch satisfies:

$$2i > l \geq 2i \times \frac{w_z}{w_z + i},$$

wherein i denotes the pixel pitch, l denotes the lens pitch, $w_z$ denotes a distance between the center of the right-eye viewing zone and the center of the left-eye viewing zone, the distance between the center of the right-eye viewing zone and the center of the left-eye viewing zone is about 70~500 mm and the pixel pitch is about 0.1~500 μm.

In the present invention, according to the description mentioned above, since the distance between the center of the right-eye viewing zone and the center of the left eye viewing zone of the three-dimensional display of the present invention is increased to be about 70~500 mm, the left eye and the right eye of the viewer enter the right-eye viewing zone or the left-eye viewing zone at the same time as the viewer shifts toward to the right hand side or to the left hand side. Meanwhile, the viewer watches a two-dimensional image. That is, the left eye and the right eye of the viewer see the same image. Therefore, the feel of dizziness and the uncomfortable viewing effect due to the inversion of the vision signal of both eyes can be greatly decreased.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
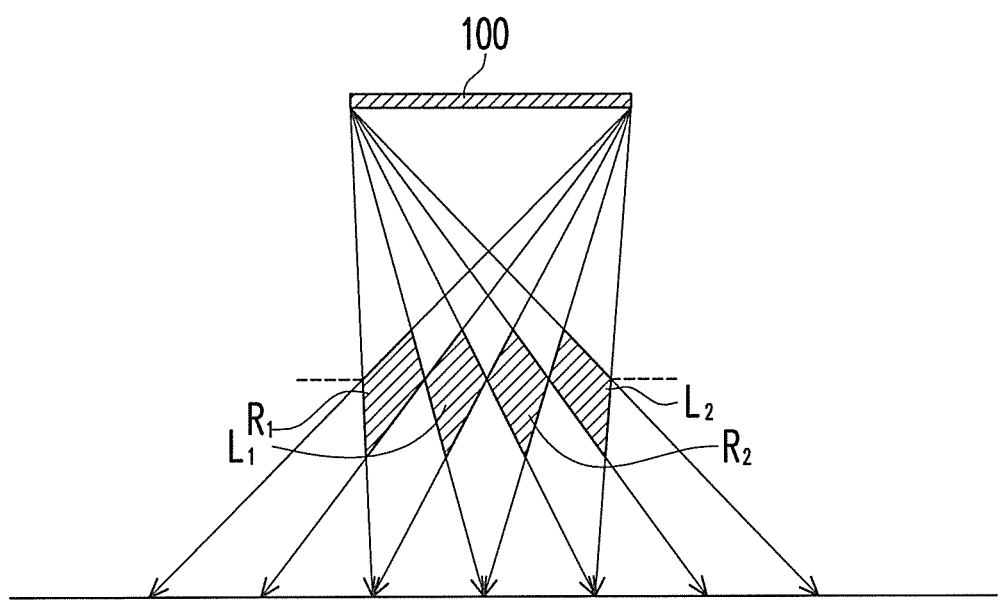
FIG. 1 is a conventional three-dimensional display which generates several right-eye viewing zones and left-eye viewing zones.
Figure 2A:
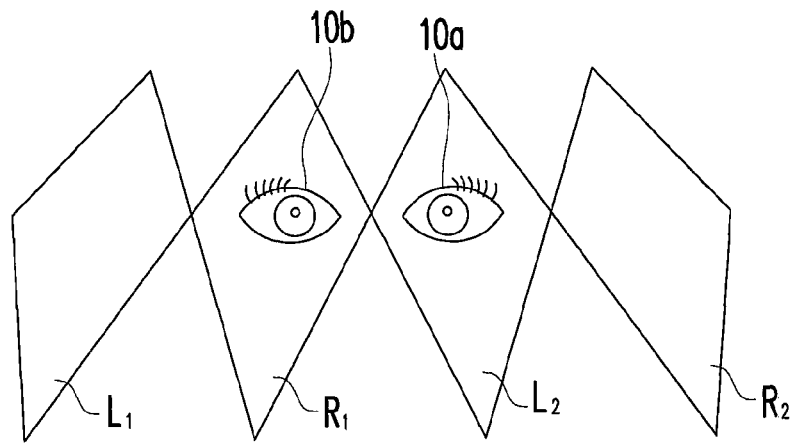
FIGS. 2A through 2C are diagrams showing that the right eye and the left eye of a viewer enter the left-right-eye inversion region as the viewer, in a right-left movement, see a reversal view from the conventional three-dimensional display.
Figure 2B:
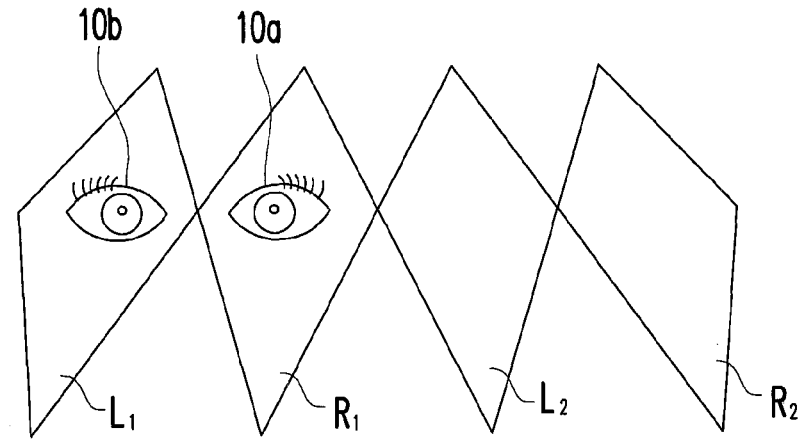
Figure 2C:
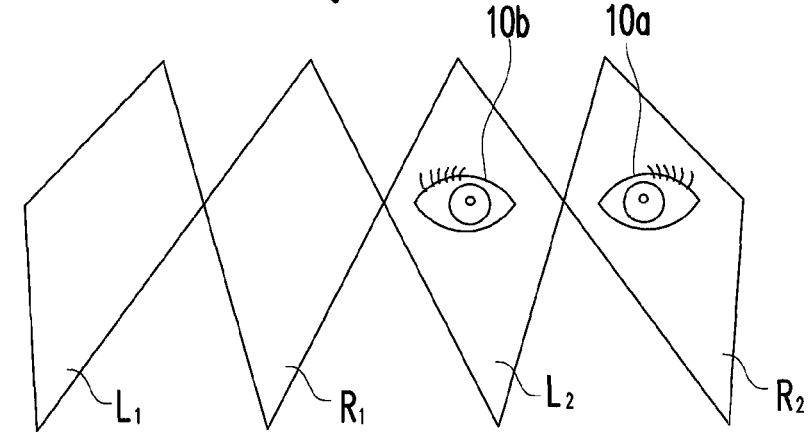
Figure 3:
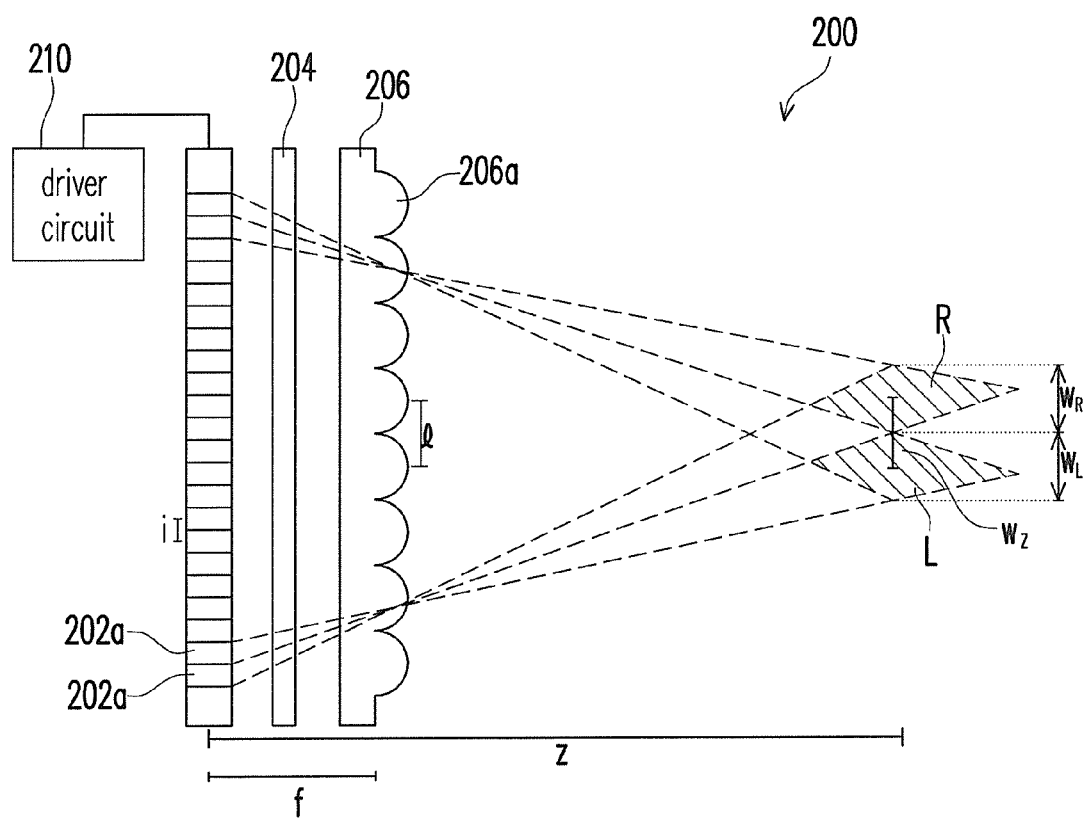
FIG. 3 is a diagram showing a three-dimensional display system according to one embodiment of the present invention.

FIG. 3 is a diagram showing a three-dimensional display system according to one embodiment of the present invention. As shown in FIG. 3, a three-dimensional display system comprises a three-dimensional display 200 and a driver circuit 210 electrically connecting to the three-dimensional display 200.

The three-dimensional display 200 at least comprises a display 202 and a micro-lens 206.

The aforementioned display 202 can be, for example, a flat display such as a liquid crystal display, an organic electro-luminescence display panel, a plasma display panel, an electrophoretic display and other adapted display. Since the aforementioned displays are well-known in the art, the displays are not detailed described herein. The display 202 are electrically connected to the driver circuit 210 and the driver circuits used to drive and control the display 202 to display the image.

Moreover, the display 202 has several pixel units 202a and each of the pixel units 202a has a pixel pitch i. The pixel units 202a include red (R) pixel unit, green (G) pixel unit and blue (B) pixel unit. In the present embodiment, the aforementioned pixel units 202a can be further sorted into right-eye pixel units and left-eye pixel units and the right-eye pixel units and the left-eye pixel units are alternatively arranged in the display 202. The right-eye pixel units and the left-eye pixel units can be arranged as followings: $R_R R_L G_R G_L B_R B_L$ or $R_R G_L B_R R_L G_R B_L$. The image signals from the right-eye pixel units of the display 202 are for the right eye of the viewer to see and the image signals from the left-eye pixel units of the display 202 are for the left eye of the viewer to see.

Figure 5:
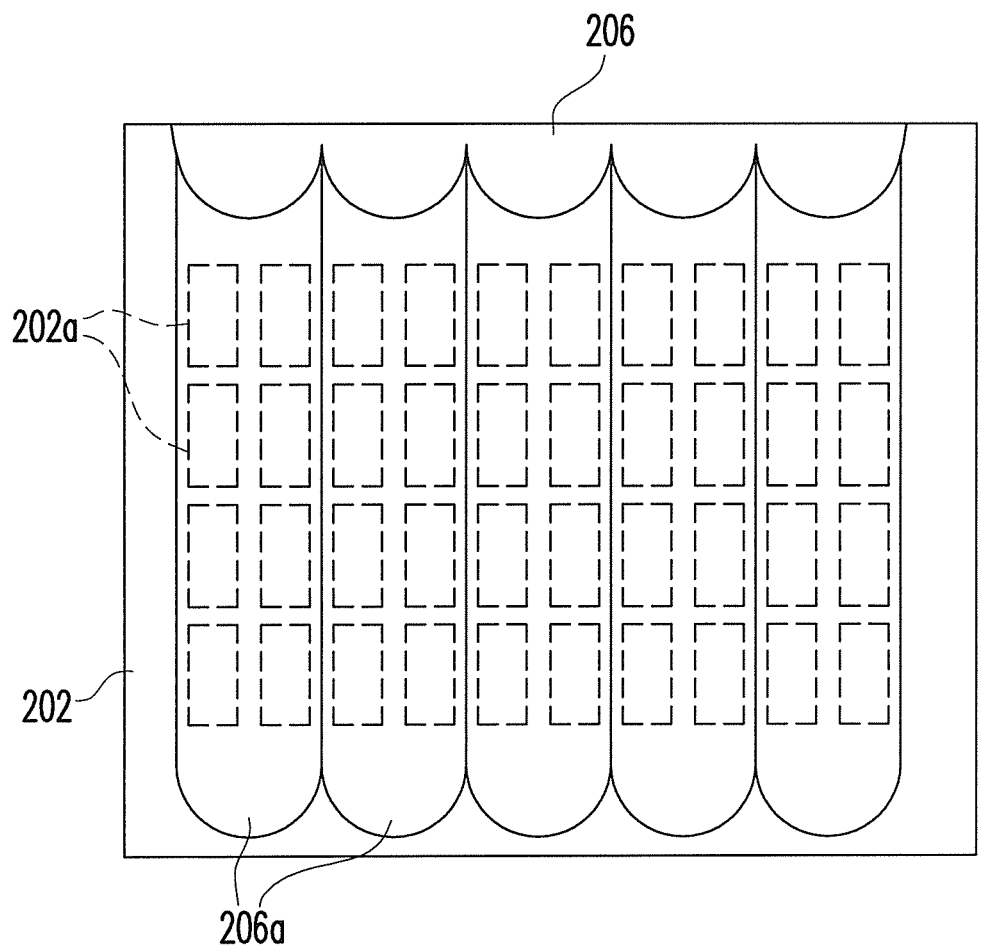
FIG. 5 is a diagram showing a display and a micro-lens stacked on each other according to one embodiment of the present invention.

The micro-lens 206 is disposed at one side of the display 202 and a distance between the micro-lens 206 and the display 202 is denoted as f. The micro-lens 206 has several lens units 206a and each of the lens units 206a has a lens pitch l. In the present embodiment, each of the lens units 206a of the micro-lens is a Lenticular lens so that the micro lens 206 is constructed by several parallel Lenticular lenses 206a. More clearly, as shown in FIG. 5, a top view showing the micro-lens 206 stacking on the display 202, each of the Lenticular lenses 206a of the micro-lens 206 covers several pixel units 202a. In the present embodiment, each of the Lenticular lenses 206a covers two rows of the pixel units 202a. However, the present invention is not limited to the arrangement mentioned above. In the other embodiment of the present invention, each of the Lenticular lenses 206a can be arranged to be corresponding to one row or two rows of the pixel units 202a.

Still, as shown in FIG. 3, in the present embodiment, an optical film set 204 is further disposed between the display 202 and the micro-lens 206. The space between the optical film set 204 and the micro-lens 206 and the space between the optical film set 204 and the display 202 can be filled with adhesive to attach the optical film set 204 onto the micro-lens 206 and onto the display 202. However, the present invention is not limited to the use of the optical film set 204 and the use of the adhesive for attaching the optical film set onto the display and the micro-lens.

It should be noticed that, a right-eye viewing zone R and a left-eye viewing zone are formed in a particular location as the image displayed on the aforementioned display 202 passes through the micro-lens 206. The distance between the center of the right-eye viewing zone R and the display 202 is equal to the distance between the center of the left-eye viewing zone L and the display 202 and is denoted as z. Furthermore, the distance between the center of the right-eye viewing zone R and the center of the left-eye viewing zone is denoted as $w_z$. In the present embodiment, $w_z$ is about 70~500 mm. Preferably, $w_z$ is about 80~300 mm. More preferably, $w_z$ is about 100~200 mm.

Normally, the relationship between the lens pitch l of the lens unit 206a and the distance $w_z$ between the center of the right-eye viewing zone R and the left-eye viewing zone can be described by the following equations:

$$l = n \times i \times \frac{z-f}{z} \qquad \text{equation (1)}$$

$$z = f \times \left(\frac{w_z}{i} + 1\right), \qquad \text{equation (2)}$$

wherein
l denotes the lens pitch;
n denotes the number of the viewing zones;
i denotes the pixel pitch;
z denotes the distance between the center of the viewing zone and the display;
f denotes the distance between the display and the micro-lens;
$w_z$ denotes the distance between the center of the right-eye viewing zone and the center of the left-eye viewing zone.

It should be noticed that the pixel pitch i is about 0.1~500 μm and preferably, is about 1~200 μm. The distance z between the center of the viewing zone and the display is about 10 cm~5 m. More particularly, if the aforementioned display 202 is a display of the portable phone, the distance z between the center of the viewing zone and the display is about 30 cm~50 cm. If the aforementioned display 202 is the display of the digital frame, the distance z between the center of the viewing zone and the display is about 70 cm. If the aforementioned display 202 is the display of the monitor, the distance z between the center of the viewing zone and the display is about 100 cm. If the aforementioned display 202 is the display of the television, the distance z between the center of the viewing zone and the display is about 2~3 m. Moreover, the distance f between the display and the micro-lens can be adjusted if necessary.

Accordingly, as shown in equation (2), the distance f between the display and the micro-lens can be determined according to the following equation:

$$f = \frac{Z}{(w_z/i) + 1}$$

Furthermore, an equation for determining the lens pitch l can be obtained by applying the equation $$f = \frac{Z}{(w_z/i) + 1}$$

in to equation (1) and the equation for determining the lens pitch l is shown as following:

$$l = n \times i \times \frac{w_z}{w_z + i}$$

The three-dimensional display of the present invention is used to generate two viewing zones (the right-eye viewing zone and the left-eye viewing zone) so that n denoting the number of the aforementioned viewing zones is 2. Thus, the lens pitch l of the present embodiment satisfies the following equation:

$$2i > l \geq 2i \times \frac{w_z}{w_z + i}$$

More clearly, when the lens pitch l of the lens unit 206a of the micro-lens 206, the pixel pitch i of the pixel unit 202a of the display 202 and the distance $w_z$ between the center of the right-eye viewing zone R and the center of the left-eye viewing zone L satisfy the aforementioned equation, the three-dimensional display can generates a right-eye viewing zone R and a left-eye viewing zone L and the distance $w_z$ between the center of the right-eye viewing zone R and the center of the left-eye viewing zone L is about 70~500 mm and the pixel pitch i of the pixel unit is about 0.1~500 μm. In practical, the lens pitch l preferably satisfies the following equation:

$$2i > l > 2i \times \frac{w_z}{w_z + i}$$

Noticeably, according to the other embodiments, the maximal width of the aforementioned right-eye viewing zone is denoted as $w_R$, the maximal width of the aforementioned left-eye viewing zone is denoted as $w_L$ and $w_R$ is larger than and equal to $w_z$ and $w_L$ is larger than or equal to $w_z$. On the other words, when $w_R$ is equal to $w_z$ and $w_L$ is equal to $w_z$, the right-eye viewing zone R does not overlap the left-eye viewing zone L. When $w_R$ is larger than $w_z$ and $w_L$ is larger than $w_z$, the right-eye viewing zone R partially overlaps the left-eye viewing zone L.

Accordingly, when the viewer watches the image displayed on the three-dimensional display shown in FIG. 3 in a way that the left eye 10a and the right eye 10b of the viewer are in the left-eye viewing zone L and the right-eye viewing zone R respectively, the viewer can see the stereo image or the three-dimensional image.

Figure 6A:
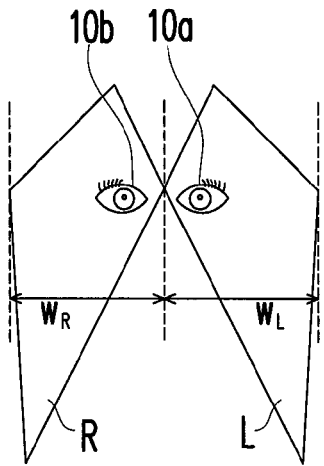
FIGS. 6A through 6C are diagrams showing that the viewer, if in a right-left movement, sees a two-dimensional image from the three-dimensional display.
Figure 6B:
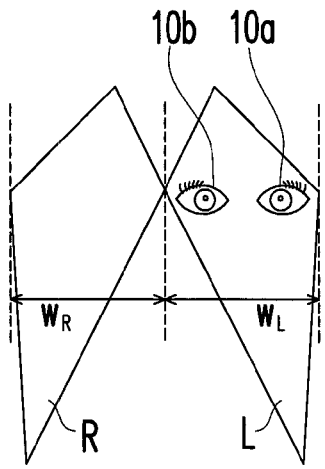

When the viewer moves to the right-hand side, as shown in FIG. 6B, the viewer watches the image in a way that both of the left eye 10a and the right eye 10b of the viewer are in the left-eye viewing zone L since the distance $w_z$ between the center of the right-eye viewing zone R and the center of the left-eye viewing zone L, in the present embodiment, is about 70~500 mm. Thus, the viewer can see the plan image or the two-dimensional image.

Figure 6C:
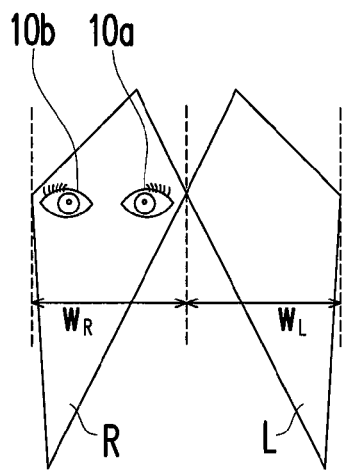

Similarly, if the viewer moves to the left-hand side, as shown in FIG. 6C, the viewer watches the image in a way that both of the left eye 10a and the right eye 10b of the viewer are in the right-eye viewing zone R since the distance $w_z$ between the center of the right-eye viewing zone R and the center of the left-eye viewing zone L, in the present embodiment, is about 70~500 mm. Thus, the viewer can see the plan image or the two-dimensional image.

As shown in FIGS. 6A through 6C, the three-dimensional display of the present embodiment can generate two dimension-three dimension-two dimension (2D-3D-2D) stereo-image display effect. Hence, when the viewer watches the image display on the three-dimensional display of the present embodiment and moves to the left-hand side or to the right-hand side, the left eye and the right eye of the viewer enter the two-dimensional image zone instead of entering the left-right-eye inversion region. That is, both of the left eye and the right eye of the viewer see the same image. Consequently, the feel of dizziness and the uncomfortable viewing effect due to the inversion of the vision signal of both eyes can be greatly decreased.

The display 202 shown in the aforementioned embodiment of FIG. 3 can be, for example, a liquid crystal display, an organic electro-luminescence display panel, a plasma display panel, an electrophoretic display and other adapted display. Since the aforementioned displays are well-known in the art, the displays are not detailed described herein. If the aforementioned display 202 is the liquid crystal display or other non-emission display, the display 202 further comprises a backlight light source. The following embodiment describes a three-dimensional display system using a liquid crystal display.

Figure 4:
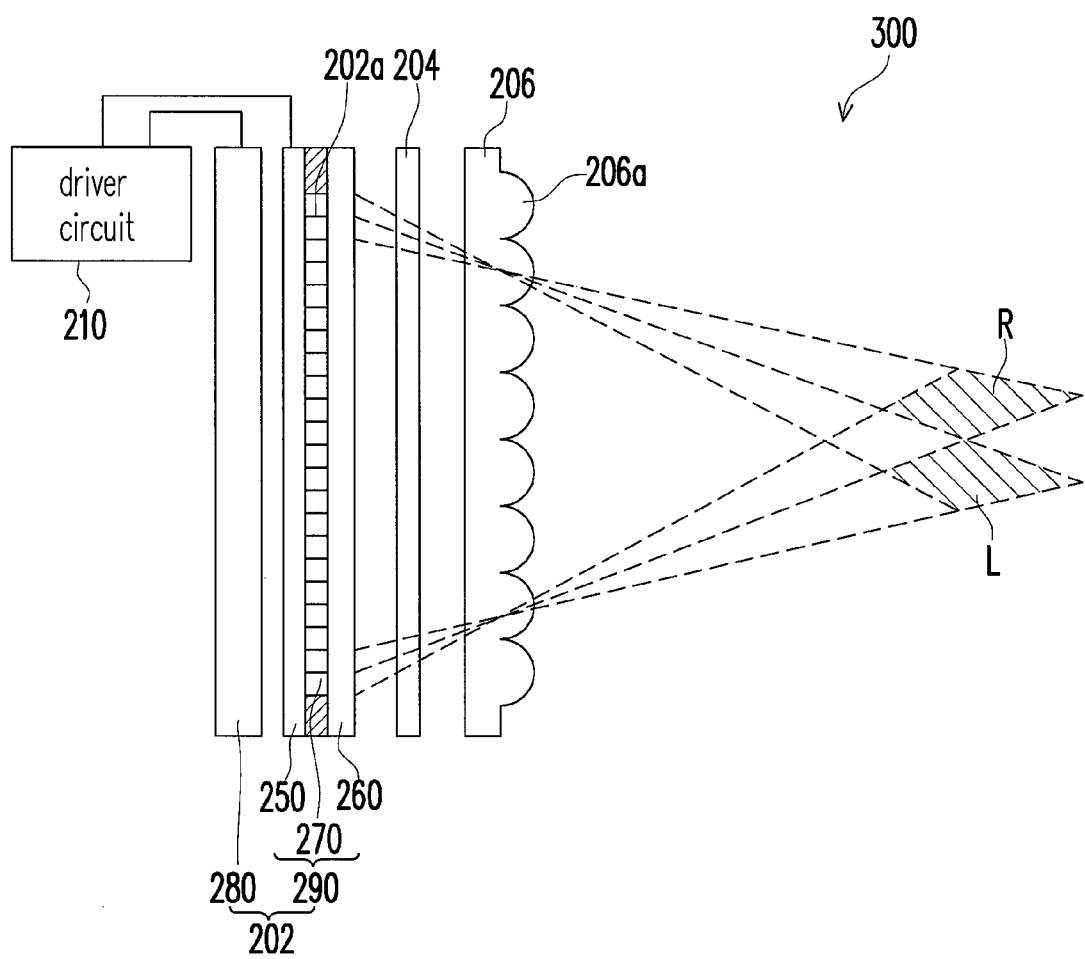
FIG. 4 is a diagram showing a three-dimensional display system according to another embodiment of the present invention.

FIG. 4 is a diagram showing a three-dimensional display system according to one embodiment of the present invention. The structure shown in FIG. 4 is similar to that shown in FIG. 3 but the difference the two embodiments is that the display 202 of the three-dimensional display system 300 is a liquid crystal display comprising a liquid crystal display panel 290 and a backlight module 280. The liquid crystal display panel 290 comprises a first substrate 250, a second substrate 260 and a liquid crystal layer 270 disposed between the first substrate 250 and the second substrate 260. Similarly, the display 202 comprises several pixel units 202*a*. In the liquid crystal display, each of the pixel units 202*a* comprises a data line, a scan line, an active device electrically connected to the data line and the scan line and a pixel electrode electrically connected to the active device, which are all disposed on the first substrate 250. The second substrate 260 can be a plain substrate or a substrate having an electrode layer disposed thereon. Furthermore, a color filter layer can be, for example, disposed on either the first substrate 250 or the second substrate 260.

The backlight module 280 is disposed on the reverse side of the first substrate 250 for providing light beams to the liquid crystal display panel 290. The backlight module 280 can be, for example but not limited to, a direct type backlight module or a side type backlight module. Moreover, the liquid crystal display panel 290 is electrically connected to the driver circuit 210 and the driver circuit 210 is used to control the liquid crystal display panel 290 to display the image. The backlight module 280 is electrically connected to the driver circuit 210 and the driver circuit 210 is used to control the switch of the backlight module 280. The driver circuit 210 of the present embodiment represented by the schematic diagram. Practically, the liquid crystal display panel 290 and the backlight module are controlled by the driver devices respectively.

Similarly, when the viewer watches the image displayed on the three-dimensional display system shown in FIG. 4, the viewer can see a stereo image or a three-dimensional image if the left eye and the right eye of the viewer are in left-eye viewing zone L and the right-eye viewing zone R respectively. If the viewer moves toward to the left-hand side or to the right-hand side, both of the left eye and the right eye of the viewer enter either the left-eye viewing zone L or right-eye viewing zone R to see a plan image or a two-dimensional image. Therefore, a 2D-3D-2D stereo-image display effect is generated.

Accordingly, since the distance $w_z$ between the center of the right-eye viewing zone and the center of the left-eye viewing zone is increase to be about 70~500 mm, both of the left eye and the right eye of the viewer enter either the left-eye viewing zone L or right-eye viewing zone R to see a two-dimensional image as the viewer moves toward to the left-hand side or to the right-hand side. That is, both of the left eye and the right eye see the same image. Therefore, the feel of dizziness and the uncomfortable viewing effect due to the inversion of the vision signal of both eyes can be greatly decreased.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A three-dimensional display, comprising:
   a display having a plurality of pixel units thereon, wherein each of the pixel units has a pixel pitch; and
   a micro-lens disposed at a side of the display and having a plurality of lens units, wherein each of the lens units has a lens pitch, and a right-eye viewing zone and a left-eye viewing zone are formed as an image displayed on the display passes through the micro-lens, and a ratio R (=l/2i) of the lens pitch (l) to twice pixel pitches (2i) satisfying:

$1 > R \geq W_z/(W_z+i)$, wherein i denotes the pixel pitch, l denotes the lens pitch, $w_z$ denotes a distance between the center of the right-eye viewing zone and the center of the left-eye viewing zone, the distance between the center of the right-eye viewing zone and the center of the left-eye viewing zone is about 70~500 mm and the pixel pitch is about 0.1~500 μm.

2. The three-dimensional display of claim 1, wherein the display is a liquid crystal display, an organic electro-luminescence display panel, an electrophoretic display or a plasma display panel.

3. The three-dimensional display of claim 2, wherein the liquid crystal display comprises a liquid crystal display panel and a backlight module.

4. The three-dimensional display of claim 1, wherein the maximal width of the right-eye viewing zone is denoted by $w_R$, the maximal width of the left-eye viewing zone is denoted by $W_L$ and $w_R$ is larger than or equal to $w_z$ and $w_L$ is larger than or equal to $w_z$.

5. The three-dimensional display of claim 1, wherein the distance between the center of the right-eye viewing zone and the center of the left-eye viewing zone is about 80~300 mm.

6. The three-dimensional display of claim 1, wherein the distance between the center of the right-eye viewing zone and the center of the left-eye viewing zone is about 100~200 mm.

7. The three-dimensional display of claim 1, wherein a distance between the display and one of the center of the right-eye viewing zone and the center of the left-eye viewing zone is about 10 cm~5 m.

8. The three-dimensional display of claim 1, wherein each of the lens units is arranged to be corresponding to at least a row of pixel units.

9. The three-dimensional display of claim 1 further comprising an optical film set disposed between the display and the micro-lens.

10. The three-dimensional liquid crystal display system of claim 1, wherein:
    when a viewer watches the image displayed on the display in a way that a left eye and a right eye of the viewer are in the left-eye viewing zone and the right-eye viewing zone respectively, the viewer sees a stereo image or a three-dimensional image;
    when the viewer moves toward a right-hand side, the viewer watches the image in a way that both of the left eye and the right eye of the viewer are in the left-eye viewing zone, such that the viewer sees a plan image or a two-dimensional image; and
    when the viewer moves toward a left-hand side, the viewer watches the image in a way that both of the left eye and the right eye of the viewer are in the right-eye viewing zone, such that the viewer sees the plan image or the two-dimensional image.

11. A three-dimensional display system, comprising:
    a three-dimensional display comprising:
    a display having a plurality of pixel units thereon, wherein each of the pixel units has a pixel pitch; and
    a micro-lens disposed at a side of the display and having a plurality of lens units, wherein each of the lens units has a lens pitch, and a right-eye viewing zone and a left-eye viewing zone are formed as an image displayed on the display passes through the micro-lens, and a ratio R (=l/2i) of the lens pitch (l) to twice pixel pitches (2i) satisfying:

$$1 > R \geq Wz/(Wz+i),$$

wherein i denotes the pixel pitch, l denotes the lens pitch, $w_z$ denotes a distance between the center of the right-eye viewing zone and the center of the left-eye viewing zone, the distance between the center of the right-eye viewing zone and the center of the left-eye viewing zone is about 70~500 mm and the pixel pitch is about 0.1~500 μm;

a driver circuit electrically connecting to the three-dimensional display for driving the three-dimensional display.

12. The three-dimensional display system of claim 11, wherein the display is a liquid crystal display, an organic electro-luminescence display panel, an electrophoretic display or a plasma display panel.

13. The three-dimensional display system of claim 12, wherein the liquid crystal display comprises a liquid crystal display panel and a backlight module.

14. The three-dimensional display system of claim 11, wherein the maximal width of the right-eye viewing zone is denoted by $w_R$, the maximal width of the left-eye viewing zone is denoted by $w_L$ and $w_R$ is larger than or equal to $w_z$ and $w_L$ is larger than or equal to $w_z$.

15. The three-dimensional display system of claim 11, wherein the distance between the center of the right-eye viewing zone and the center of the left-eye viewing zone is about 80~300 mm.

16. The three-dimensional display system of claim 11, wherein $w_z$ is about 100~200 mm.

17. The three-dimensional display system of claim 11, wherein a distance between the display and one of the center of the right-eye viewing zone and the center of the left-eye viewing zone is about 10 cm~5 m.

18. The three-dimensional display system of claim 11, wherein each of the lens units is arranged to be corresponding to at least a row of pixel units.

19. The three-dimensional display system of claim 11, wherein further comprising an optical film set disposed between the display and the micro-lens.

20. The three-dimensional liquid crystal display system of claim 11, wherein:

when a viewer watches the image displayed on the display in a way that a left eye and a right eye of the viewer are in the left-eye viewing zone and the right-eye viewing zone respectively, the viewer sees a stereo image or a three-dimensional image;

when the viewer moves toward a right-hand side, the viewer watches the image in a way that both of the left eye and the right eye of the viewer are in the left-eye viewing zone, such that the viewer sees a plan image or a two-dimensional image; and when the viewer moves toward a left-hand side, the viewer watches the image in a way that both of the left eye and the right eye of the viewer are in the right-eye viewing zone, such that the viewer sees the plan image or the two-dimensional image.

21. A three-dimensional liquid crystal display system, comprising:

a liquid crystal display comprising:
  a plurality of pixel units, wherein each of the pixel units has a pixel pitch; and
  a micro-lens disposed at a side of the liquid crystal display and having a plurality of lens units, wherein each of the lens units has a lens pitch, and a right-eye viewing zone and a left-eye viewing zone are formed as an image displayed on the liquid crystal display passes through the micro-lens, and a ratio R (=l/2i) of the lens pitch (l) to twice pixel pitches (2i) satisfying:

$$1 > R \geq Wz/(Wz+i),$$

wherein i denotes the pixel pitch, l denotes the lens pitch, $w_z$ denotes a distance between the center of the right-eye viewing zone and the center of the left-eye viewing zone, the distance between the center of the right-eye viewing zone and the center of the left-eye viewing zone is about 70~500 mm and the pixel pitch is about 0.1~500 μm;

a driver circuit electrically connecting to the liquid crystal display for driving the liquid crystal display.

22. The three-dimensional liquid crystal display system of claim 21, wherein the liquid crystal display comprises a liquid crystal display panel and a backlight module.

23. The three-dimensional liquid crystal display system of claim 21, wherein:

when a viewer watches the image displayed on the liquid crystal display in a way that a left eye and a right eye of the viewer are in the left-eye viewing zone and the right-eye viewing zone respectively, the viewer sees a stereo image or a three-dimensional image;

when the viewer moves toward a right-hand side, the viewer watches the image in a way that both of the left eye and the right eye of the viewer are in the left-eye viewing zone, such that the viewer sees a plan image or a two-dimensional image; and when the viewer moves toward a left-hand side, the viewer watches the image in a way that both of the left eye and the right eye of the viewer are in the right-eye viewing zone, such that the viewer sees the plan image or the two-dimensional image.

* * * * *